United States Patent [19]

Norbäck

[11] 4,246,962
[45] Jan. 27, 1981

[54] DEVICE FOR USE IN CONNECTION WITH HEAT EXCHANGERS FOR THE TRANSFER OF SENSIBLE AND/OR LATENT HEAT

[75] Inventor: Per S. Norbäck, Lidingö, Sweden

[73] Assignee: Aktiebolaget Carl Munters, Sollentuna, Sweden

[21] Appl. No.: 868,002

[22] Filed: Jan. 9, 1978

[30] Foreign Application Priority Data

Jan. 14, 1977 [SE] Sweden ............................. 7700404

[51] Int. Cl.³ .............................................. F28F 3/08
[52] U.S. Cl. ................................................... 165/166
[58] Field of Search ............... 261/112 CT, DIG. 11; 165/148, 157, 166, 167; 55/278

[56] References Cited

U.S. PATENT DOCUMENTS

| | | | |
|---|---|---|---|
| 2,392,444 | 1/1946 | Amand et al. | 165/157 X |
| 2,617,634 | 11/1952 | Jendrassik | 165/166 X |
| 2,623,736 | 12/1952 | Hytte | 165/166 X |
| 2,945,680 | 7/1960 | Slemmons | 165/166 X |
| 3,240,268 | 3/1966 | Armes | 165/167 |
| 3,415,502 | 12/1968 | Munters | 261/DIG. 11 |
| 3,661,203 | 5/1972 | Mesher | 165/167 |
| 4,139,584 | 2/1979 | Hulmberg | 261/DIG. 11 |

Primary Examiner—Samuel Scott
Assistant Examiner—Theophil W. Streule, Jr.
Attorney, Agent, or Firm—Eric Y. Munson

[57] ABSTRACT

A device for use with heat exchangers for the transfer of sensible and latent heat between a gaseous and liquid medium is provided. The device includes a first set of narrower passageways defined between at least two corrugated foils to receive the liquid medium, and a second set of wider passageways to receive the gaseous medium. The surfaces of the foils defining the narrow liquid passageways have closely spaced fine ridges which cross the corrugations. These fine ridges cause flow resistance and result in the liquid medium in the liquid passageways being distributed over the entire surface area of the foils defining the liquid passageways, thus enhancing heat transfer. Furthermore, because the ridges tend to rigidify the foils defining the liquid passageways, these foils can be formed from a relatively thin material, thus further enhancing heat transfer between the liquid and the gas mediums.

5 Claims, 6 Drawing Figures

DEVICE FOR USE IN CONNECTION WITH HEAT EXCHANGERS FOR THE TRANSFER OF SENSIBLE AND/OR LATENT HEAT

FIELD OF THE INVENTION

The present invention relates to a device for use with heat exchangers for the transfer of sensible and/or latent heat between a gaseous and a liquid medium which are caused to flow through respective sets of passages separated by essentially parallel foils provided with prominences, preferably corrugations, the foils that bound the liquid passages having an inlet and an outlet for the liquid that are separated from the gas passages and, preferably, being sealed individually around their peripheries. Although the invention is not limited thereto, one important application of the invention is as a ventilation heat exchanger, in which the supply air and exhaust air respectively entering and leaving indoor premises exchange their heat content by the agency of a liquid circulating in a closed system. For this purpose the two air streams are passed through separate exchanger units where they are brought in heat-exchanging contact with the liquid, which circulates in a system of pipes between the said exchanger units.

SUMMARY OF THE INVENTION

The invention aims to make available a device of the type having wide passages for the gas, this being an advantage from the point of view of soiling and cleaning. Another object is to make available a heat exchanger which, although having large air passages, is of compact form and permits the use of partitions made of materials having low thermal conductivity. A further object is to make available a heat exchanger of high capacity and/or efficiency which at the same time is simple and cheap to manufacture. It is a specific object of the invention to make available a heat exchanger which will withstand a comparatively high pressure of liquid in the liquid passages without suffering deformation that would disrupt the flow pattern even if the thickness of the foils is small. The essential features of the invention are: that the foils fall together in pairs, thanks to their prominences fitting together, to form narrow liquid passages of substantially uniform width, while the gas passages are of considerably greater width; and that the width of the fluid passages is determined by closely-spaced distance elements of small height in proportion to that of the prominences and arranged so as to afford a flow resistance that will promote the distribution of the liquid over the surface area of the liquid passages. In the design with corrugated foils, the corrugations of the foils bounding the liquid passages run parallel, while those of the interjacent gas passages cross each other and bear upon each other directly or indirectly. Another feature of the invention is that the foils bounding the liquid passages are rigidly united to each other by means of spacing elements. The spacing elements are preferably formed of prominences, e.g. in the form of parallel grooves or flutings, in the foils themselves, which may moreover be so formed as to stiffen the foils and permit the flow of liquid in many directions.

The invention enables the widths of the passages for the liquid and for the gas to be dimensioned in full consideration of the large difference between the specific heat capacities of the respective media, i.e. the liquid passages are narrow compared to the gas passages, but notwithstanding this, the distribution of the liquid over the entire surface of the foils is ensured. The heat-transferring areas on the gas side and on the liquid side can be made approximately equal and the foils separating the gas passages from the liquid passages can be made thin.

The invention will be described below with reference to examples of embodiments illustrated on the attached drawings, and further characteristic features of the invention will become apparent in the course of the description.

DETAILED DESCRIPTION OF THE DRAWINGS

Figure 5:
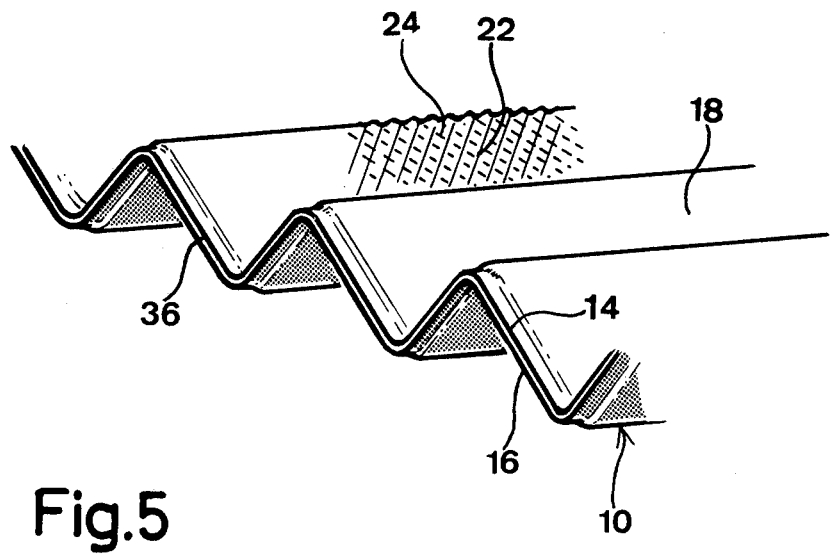
FIGS. 5 and 6, finally, show perspectives of the edge of a foil unit forming a liquid passage, in two embodiment.
Figure 6:
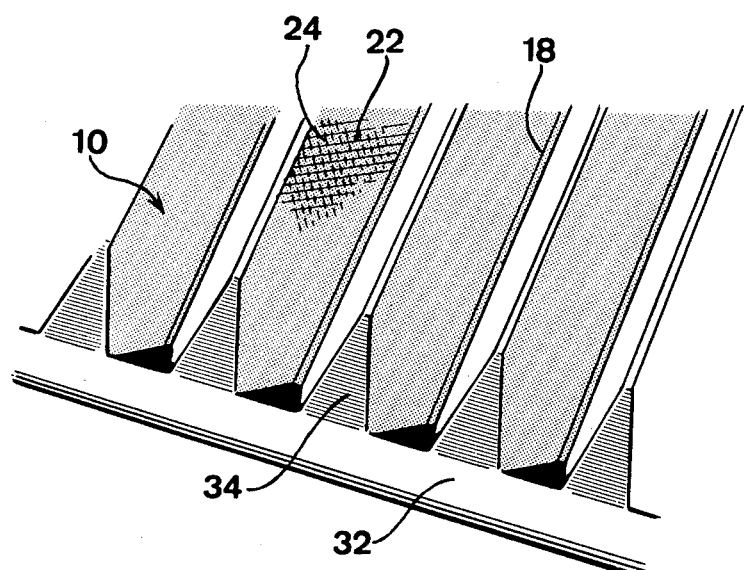

In the drawings, 10 is used generally to denote the units that form the individual liquid passages of the heat exchanger, being each composed of two foils 14, 16 which are both formed with creases or corrugations 18 of comparatively great depth, as from between 5 mm and 15 mm to 25 mm. The corrugations 18 of both the foils run parallel and fit together so that the foils form between them a liquid passage 20 that follows substantially the same undulating contour as the foils themselves. Furthermore, the foils are provided with fine waves or grooves 22 and 24, as is most clearly illustrated in FIG. 2 and also suggested in FIGS. 5 and 6. The depth and pitch of the grooves are only a fraction of the corresponding dimensions of the larger corrugations 18. Thus, if the depth of the large corrugations 18 is 12 mm, that of the grooves should preferably be no more than 1 mm to 2 mm. The depth of the grooves should preferably be within the range from 0.5 mm to 3 mm, or no more than one quarter to one third the depth of the large corrugations. The width of the liquid passages 20 is kept small, as this has a favorable effect on the flow resistance on the gas side, while at the same time the narrow liquid passages offer sufficient resistance to the liquid stream to ensure a satisfactory distribution of the circulating liquid, and one of the functions of the grooves is to act as spacing elements, keeping the foils 14 and 16 at a suitable distance from each other. The grooves 22, 24 also make an important contribution to the strength of the foils, enabling the latter to withstand a relatively high internal pressure in the liquid passages without sacrificing the uniform width of the said liquid passages in the heat exchangers, this being of vital importance in order to ensure an even distribution and flow rate of the liquid in the narrow passages.

The fine corrugations or flutings 22, 24 extend in the form of continuous ridges across the bottoms and slopes of the large corrugations 18, and preferably also across their tops. Further, in the embodiment illustrated, the grooves 22 and 24 cross each other, and the grooves, 22 or 24, in at least one of the foils, 14 or 16 respectively, form an oblique angle with the large corrugations, this being essential if the foils are to be able to bear on each other at the points of intersection of the grooves and at the same time offer free passage to the liquid in every direction.

Figure 3:
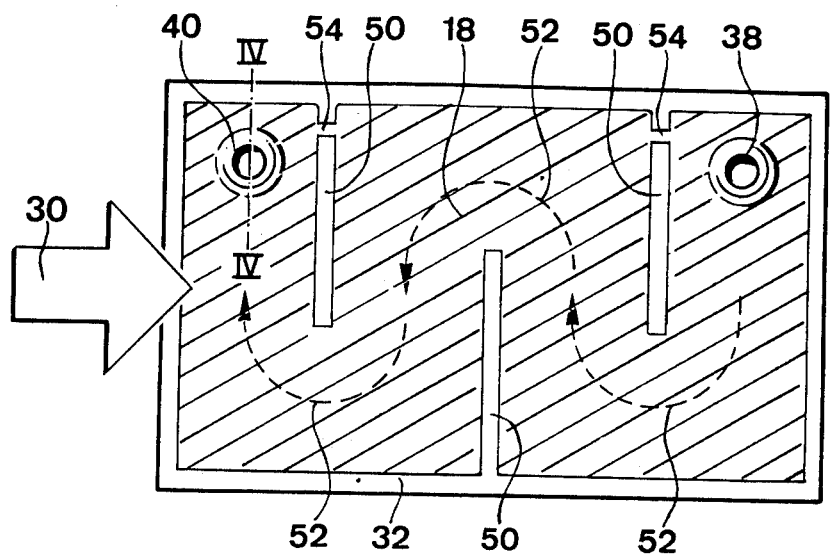
FIG. 3 shows a side view of the heat exchanger.
Figure 4:
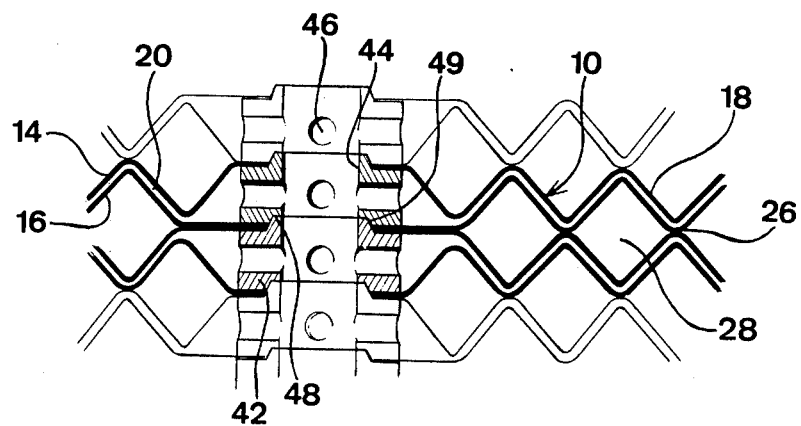
FIG. 4 shows a section on the line IV—IV in FIG. 3, on a larger scale.

The freedom of the liquid to flow in all directions is especially important in the form of embodiment illustrated in FIG. 3, where the liquid must be able to flow both parallel and perpendicular to the air stream, and at all intermediate angles.

Figure 2:
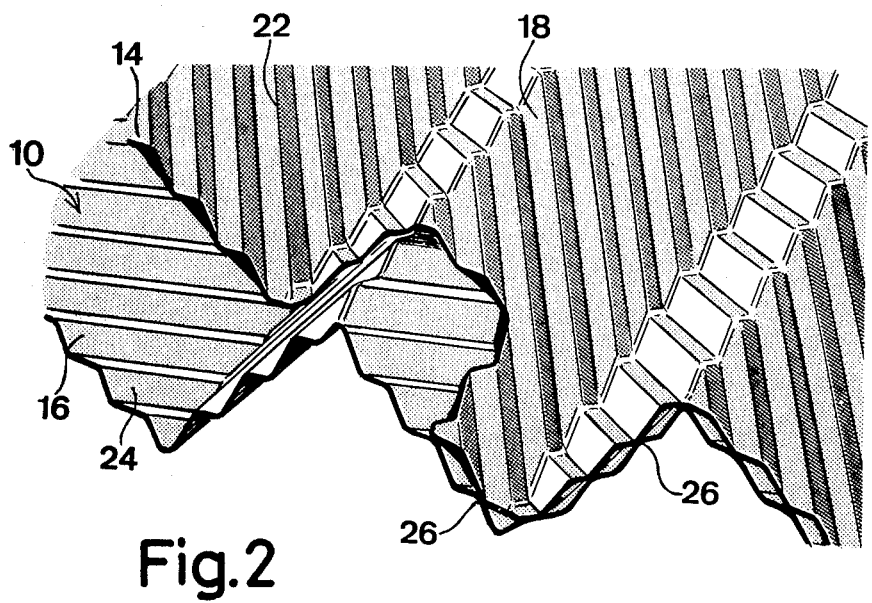
FIG. 2 is another perspective, on a greatly magnified scale, of part of the two foils which together bound a liquid passage.

Thanks to this design of the foils, they may be made of thin material, such as plastic or aluminium, and still be capable of withstanding a considerable internal pressure in the liquid passages. Thus, a plastic foil may be of thickness from just a few tenths of a millimeter up to 1 mm or more. The strength of the foils in this respect afforded by the above design is especially enhanced if the fine grooves of the foil units 10 are united to each other at the points 26 of the corrugations (FIG. 2). This is preferably achieved by applying solvent and/or glue to the tops of the grooves. In this manner the foil units 10 can be endowed with sufficient strength to withstand an internal liquid pressure of 5 m head of water (50 000 Pa) or more without suffering deformation that noticeably alters the distance between the two foils forming each unit.

While the corrugations 18 of the foils 14, 16 are parallel and congruent on the liquid side, the corrugations of any two adjacent units 10 forming a gas passage 28 cross each other. The corrugations 18 form an acute angle with the air stream, as is most clearly apparent from FIG. 3. This angle may range from between 15° and 30° to 60°. If the units 10 are all of the same design, the intersections are obtained by rotating alternate units through 180°. The units 10 bear on each other at the intersections of the large corrugations 18. As a result, the distance between the two foils bounding a gas passage varies in all directions from zero to twice the corrugation depth, which creates favorable conditions for the transfer of heat between the gas and the foil surface. Thus, if the corrugations 18 are 12 mm deep, as mentioned above, the width of the gas passages will range from 0 to 24 mm, which gives an average of 12 mm.

The fine grooves 22, 24 are naturally also apparent on the gas side, although here they are of subordinate importance for the width of the passages. On the liquid side, however, the width of the liquid passages is determined by the depth of the grooves, so that if the grooves are 2 mm deep, the width of the liquid passages will vary from 0 to 4 mm, with a mean value of 2 mm. Since the pressure of the gas, such as air, inside the gas passages 28 is negligible, the units 10 need only bear on each other at the intersections of the large corrugations 18, although here, too, it would be possible to have the foils rigidly united.

Figure 1:
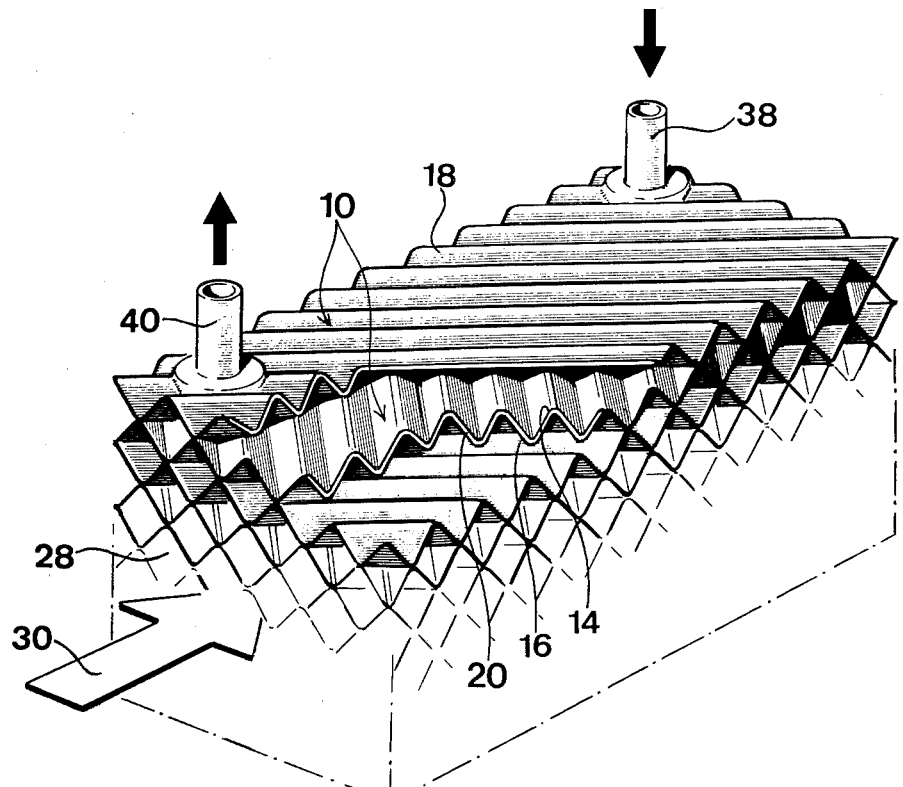
FIG. 1 is a perspective of part of a heat exchanger assembly designed in accordance with the invention.

The gas passages 28 are open to allow the gas, such as air, to pass through the entire assembly of foils as indicated by the arrow 30 in FIG. 1. If the heat exchangers are used as e.g. ventilation exchangers, the plant will include two exchanger assemblies, fresh outdoor air being blown by fans through one of the assemblies, while stale indoor air is blown through the other. Heat exchange between the air streams is brought about through the agency of a liquid circulating through tubes running between the liquid passages of two heat exchangers.

The liquid passages 20 are sealed round the edges in that the two foils 14, 16 forming the individual units 10 are joined together, the joint being impervious to liquid. Such a joint may be achieved if a strip along the edge of the foil 32 is not corrugated but flat, thus allowing the said edge strips of the two foils to be united by welding or gluing. In order to reduce the pressure gradient as the gas enters and leaves the gas passages, the large corrugations 18 may be beveled off at these points, as shown at 34 in FIG. 6. However, it would also be possible to allow the corrugations 18 to continue all the way out to the edge and there to unit them with a welded seam 36 or similar joint following the contour of the corrugations. In this case the pressure gradient as the air passes the edge of the foils is still further reduced.

All the liquid passages 20 communicate with a common inlet 38 and outlet 40. For this purpose, the foil units 10 are provided with rings 42 arranged one directly behind the other and having central openings 44 coaxial with the inlet 38 and the outlet 40, respectively. The rings act as spacing elements having an axial dimension equal to the depth of the large corrugations 18. The foils are provided with openings for the rings, with the two foils 14, 16 that form a liquid passage 20 extending one over each of the plane faces of the ring and bearing on the said faces. Radial holes 46 permit communication between the liquid passages 20 and the central ducts 44 of the rings. The rings may have a central conical projection 48 on one side that fits into a matching conical recess 49 on the other side to facilitate the mutual location and the sealing together of the rings. The foil units 10 must be sealed together so as to be watertight, which is preferably achieved by applying a thrust force to the outer rings of an exchanger unit. Care is taken in this case to ensure that the rings are so designed that the thrust force applies through the plane faces of the rings, and not through the conical projections, so that the interjacent foils of two adjacent foil units are compressed together. It is also possible to introduce a sealing element of some suitable material, e.g. rubber, between the compressed plastic foils.

The liquid passages are thus connected via the rings 42 to a common inlet distribution pipe and a common outlet distribution pipe. These pipes have one end connected to the inlet fitting 38 and the outlet fitting 40, respectively, while the other end (not illustrated) is sealed. To distribute the liquid stream over the entire extent of the narrow liquid passages, and thus achieve optimal exchange of heat with the gas in the gas passages, the two foils 14, 16 bounding a liquid passage may be united along strips extending from opposite edges alternately part of the way across the foils, so that the liquid follows a zigzag path between the inlet 38 and the outlet 40, as suggested by the arrows 52 in FIG. 3. The foil units 10 may be provided with venting holes 54 to permit the escape of air between the strips 50 and the evacuation of any air trapped between the said strips. The route thus taken by the liquid, resulting in repeated cross-current contact, achieves an effect similar to counter-current contact between the streams of liquid and air.

The liquid may be water, to which anti-freeze agents may be added if the exchanger is to be in service under conditions of low gas temperature, such as outdoor air temperatures.

The invention is, of course, not restricted to the embodiment illustrated, but may be varied in numerous respects within the terms of its basic idea. Thus, the heat exchangers may also be used in cooling towers, i.e. for the cooling of water by means of a stream of air, as in conditioning plants. In this case the walls of the gas passages may be made with water-absorbent surfaces in a manner known per se and the said surfaces kept damp by the intermittent supply of water. As the air stream passes through the gas passages the water evaporates, thus binding heat and cooling the liquid or water circulating in the liquid passages. The heat exchanger may then be operated during the cold period of the year as a so-called dry cooling tower, in which case no water is introduced into the gas passages. A cooling tower operating in this manner will possess the special advantage of being mist-free, since the heated air leaving the gas passages will not have undergone a change in its absolute humidity. The heat exchangers may also be designed for the drying of gas, such as air, in which case the walls of the gas passages are provided with a layer having hydroscopic properties. Preferably this layer will be of absorbent character, and impregnated with a hygroscopic liquid such as lithium chloride solution. As humid air passes through the gas passages, some of the moisture it contains will be taken up by the hygroscopic substance, while at the same time the temperature of the said air may be controlled, e.g. reduced, by the liquid circulating through the liquid passages. To regenerate the hygroscopic substance, i.e. drive off the moisture it has taken up, a hot liquid, such as water, can be caused intermittently to pass through the liquid passages so as to dry out the hygroscopic layer. In order for the result of drying to be satisfactory, the air stream passing through the gas passages during drying must be caused to flow in the opposite direction to the air stream that gives up moisture, and discharged into the atmosphere or a condenser.

For the thermodynamic performance of the latter two embodiments—the evaporation-cooled cooling tower element, and the drier—it is most important that the foils 14, 16 separating the liquid passages and the gas passages present a low resistance to the passage of heat, since the amounts of energy to be transferred in these applications are considerably greater than those transferred in ventilation exchangers.

It is especially important that the thermal resistance of the foil 10 is not permitted to exceed by much the thermal resistance between the gas and the surface of the foil.

The streams of gas and liquid are, of course, to be separate. In certain cases it is unnecessary to seal the liquid passages in the individual units 10 on all sides, but they may be open at the top and bottom for the water to run vertically downwards through them, while the air passes horizontally through the gas passages without coming in contact with the water.

The corrugated or creased form of the foils is to be preferred, although it is possible to give them the required bulging form e.g. by means of bowl-shaped elevations spaced over the surface of the foils in such a way that the foils can fit together in pairs on the liquid side, while producing turbulent flow in the gas and/or serving as spacing elements on the gas side. As is most clearly apparent from FIG. 3, the gas in the gas passages passes straight over the strips or projections 50, the corrugations being beveled off here, as at the outside edges (34) in FIG. 6, to avoid pressure losses in the gas stream.

What is claimed is:

1. An exchanger body for transferring sensible heat, latent heat or both between a gas and a liquid, comprising:
  (a) a plurality of contiguous layers of sheet units (10) having relatively large corrugations extending continuously on substantially straight parallel lines over the surface area of each unit;
  (b) each of said units (10) comprising a pair of thin foils (14, 16) having their large corrugations identically oriented in spaced nested relationship to define between them relatively narrow liquid passages (20) of substantially uniform width; extending substantially laterally to define a sinuous passage through which the liquid is passed from the liquid inlet to the liquid outlet means;
  (c) the inclined surfaces of the relatively large corrugations of each of said thin foils additionally having relatively small corrugations forming closely spaced ridges and grooves (22, 24) spacing said foils from one another to define said narrow liquid passages and to impart rigidity to said foils;
  (d) said ridges and grooves being angularly oriented relative to each other to promote even distribution of the liquid throughout the surface area of said narrow liquid passages;
  (e) said layers being angularly oriented relative to one another so that the relatively large corrugations in alternate units will cross the relatively large corrugations of the intervening units with their apices bearing against one another at their points of intersection to form relatively large open gas passages of non-uniform width.

2. A heat exchanger as claimed in claim 1 wherein said respective surfaces of said foils defining each of said liquid passages are joined to each other at the fine ridges on said respective surfaces.

3. A heat exchanger as claimed in claim 1 wherein said gas passages are open along at least two opposite sides, and said corrugations are beveled off towards a flat edge portion that unites two foils forming one of said liquid passages.

4. A heat exchanger as claimed in claim 3 wherein said parallel corrugations of the liquid passages extend out to the edges of the foils, at least at the two opposite open sides, so that the juncture uniting said foils follows a corrugated contour.

5. A heat exchanger as claimed in claim 1 wherein the surfaces of said foils defining said gas passages include a layer of material having hygroscopic properties.

* * * * *